(12) United States Patent
Shingai et al.

(10) Patent No.: US 6,865,787 B2
(45) Date of Patent: Mar. 15, 2005

(54) NUMERICAL CONTROL (NC) PROCESSOR WITH ONBOARD GRINDING UNIT

(75) Inventors: Kouki Shingai, Fukuoka-ken (JP); Toshiro Morikawa, Fukuoka-ken (JP)

(73) Assignee: Seibu Electric & Machinery Co., Ltd., Fukuoka-ken (JP)

( * ) Notice: Subject to any disclaimer, the term of this patent is extended or adjusted under 35 U.S.C. 154(b) by 104 days.

(21) Appl. No.: 10/446,932

(22) Filed: May 29, 2003

(65) Prior Publication Data

US 2004/0074073 A1 Apr. 22, 2004

(30) Foreign Application Priority Data

Oct. 21, 2002 (JP) ......................................... 2002-305245

(51) Int. Cl.[7] .............................................. B23P 23/02
(52) U.S. Cl. ................................ 29/28; 29/565; 29/50; 29/52; 29/53; 29/54; 29/56; 451/69; 451/70; 451/255; 451/256
(58) Field of Search ........................ 29/28, 27 R, 27 C, 29/565, 50, 52–56; 451/65, 67, 69–70, 42, 240, 255–256; 82/1.11, 129; 409/165

(56) References Cited

U.S. PATENT DOCUMENTS

| | | | | |
|---|---|---|---|---|
| 2,056,707 A | * | 10/1936 | Blazek et al. | 29/28 |
| 2,101,569 A | * | 12/1937 | Blazek et al. | 29/28 |
| 2,367,137 A | * | 1/1945 | Olsson | 29/28 |
| 4,460,275 A | | 7/1984 | Spriggs | |
| 5,363,597 A | * | 11/1994 | Gottschald et al. | 451/69 |
| 5,515,894 A | * | 5/1996 | Dunn | 29/28 |
| 6,558,586 B1 | * | 5/2003 | Padiou et al. | 451/42 |

FOREIGN PATENT DOCUMENTS

| | | |
|---|---|---|
| EP | 0 685 298 A1 | 12/1995 |
| EP | 0 849 038 A2 | 6/1998 |
| EP | 1 203 626 A1 | 5/2002 |
| JP | 4-63648 A * | 2/1992 |
| JP | 7-276104 | 10/1995 |
| JP | 8-57702 | 3/1996 |
| JP | 11-309602 | 11/1999 |
| JP | 2002-126907 | 5/2002 |
| JP | 2003-94204 | 4/2003 |
| WO | WO 01/66308 A1 | 9/2001 |

OTHER PUBLICATIONS

Patent Abstract of Japan, JP 11309602, published Sep. 11, 1999, applicant Seibu Electric & Mach Co Ltd., entitled "Working for non–axisymmetric aspherical surface".

* cited by examiner

*Primary Examiner*—Erica Cadugan
(74) *Attorney, Agent, or Firm*—Browdy and Neimark, P.L.L.C.

(57) ABSTRACT

A numerical control (NC) processor with an onboard grinding unit is disclosed in which a workpiece is first cut in a preselected contour with a Y-axis cutting tool, and then subjected to honing operation intact whereby both the cutting and honing operations can be performed with just a single processor with high-speed, high-acceleration. With the NC processor, the Y-axis cutting tool is mounted on a sliding base above an X-axis table in a way allowed to move back and forth in a Y-axis direction, while a grinding unit is installed in close proximity to the sliding base. A slider moves back and forth in synchronized relation with rotation of a work spindle to first let the Y-axis cutting tool cut the workpiece into a preselected contour, and then cause a buffing material of the grinding unit to grind a work surface of the workpiece into a high-quality surface finish in conformity with a programmed contour while the workpiece remains held intact in a chucking device.

9 Claims, 4 Drawing Sheets

PRIOR ART

NUMERICAL CONTROL (NC) PROCESSOR WITH ONBOARD GRINDING UNIT

BACKGROUND OF THE INVENTION

1. Field of the Invention

The present invention relates to a numerical control processor, called herein NC processor, with an onboard grinding unit, in which a workpiece held on a work spindle is cut or machined by a Y-axis tool moved in and out with high-speed and high-acceleration in synchronized relation with a turning of the spindle, followed by being polished or finished by the grinding unit.

2. Description of the Prior Art

There is conventionally known a lathe with an onboard grinding machine, in which a workpiece cut into a desired form can be introduced to grinding operation intact without removed from chucks on a spindle of the lathe. In Japanese Patent Laid-Open No. 7-276104, there is disclosed an example of the prior lathe with onboard grinding machine, in which a cross slide is mounted on a reciprocating carriage that is installed on a machine bed of a lathe with a feed control. A tool rest is placed on this side of a horizontal top surface of the cross slider while a motor-driven grinding wheel is placed on the far side of the horizontal top surface of the cross slider. The grinding wheel is supported on a pedestal that is fixed at a horizontal bottom thereof to the horizontal top surface of the cross slider in a way keeping an axis of the grinding wheel parallel and virtually flush with an axis of a spindle.

Moreover, there is also known an attachment used in turret lathes to allow the composite processing lathes to perform a imperfect circular machining or eccentric machining with high efficiency and high precision without making a sacrifice of specific function in the composite processing lathes. Japanese Patent Laid-Open No. 8-57702, for example, discloses the attachment of the sort stated just earlier. The prior attachment to make the imperfect circular contour and eccentric contour is fastened to any one of turning tool stations on a turret tool holder of the composite processing lathe and indexed for up to machining position where a clutch jaw on a driving shaft end in the tool holder makes engagement with another clutch jaw on a driven shaft end of the attachment. With the composite processing lathe constructed as stated earlier, a servomotor in the tool holder using NC drive to control the turning position of cutting tool actuates a rotating shaft through a rack-and-pinion drive to move the tool holder along an X-axis linear guide way, providing accurate X-axis position control relative to a turning angle of a spindle through synchronous control of a spindle motor with a rotating shaft motor to perform the imperfect circular machining or eccentric machining.

A process for producing an asymmetrically centered, aspheric surface with accuracy and very short time, using NC processors is known to those skilled in the art. The prior process is disclosed, for example in Japanese Patent Laid-Open No. 11-309602, in which a Z-axis table having a headstock thereon is kept against movement while on a processing operation. A workpiece is mounted in a chuck on the headstock to be driven with a spindle motor, while a slider having a cutting tool thereon moves in and out in a Z-axis direction under NC control. Moreover, an X-axis table supporting the slider thereon travels in a reciprocating manner in the Z-axis direction. Thus, the slider and the X-axis table are allowed to reciprocate with one another in synchronized relation with the turning of the workpiece.

The recent NC processors are designed to shape any end face and an external diameter of a workpiece into a desired complex contour with three machine axes: a turning axis of a spindle, an X-axis and a Y-axis. Programming for turning the workpiece consists of an incremental amount of movement in a specific period of time. The program for the numerical control is fed to the NC processor from any external personal computer via a high-speed bus to perform direct numerical control (DNC) operation, which performs automatic operation while on read-in of the programs through an interface. According to the DNC operation, the read-in programs may be selected and the computer numerical control (CNC) is performed while on determining the execution sequence and times of the programs. Moreover, the advanced NC processors have learning functions on the X- and Y-axes, and can be controlled for even the Z-axis in the same way as to the X- and Y-axes.

Meanwhile, the present applicant has developed the NC processor of the sort shown in FIG. 4, which is disclosed in, for example Japanese Patent Laid-Open No. 2003-94204. The NC processor is envisaged to machine a plurality of works 9A including lenses, and so on at the same time. The NC processor is comprised of a work spindle 10 driven with a spindle motor 7 and supported for rotation on a headstock 5 arranged above a machine bed 2, a chuck 8 clamping a jig block 17 in a relation that a turning axis thereof is in axial alignment with a turning axis of the work spindle 10, works 9A fastened to the jig block 17 in a way positioned circumferentially at regular intervals around the turning axis of the jig block 17, a Z-axis table 3 supporting the headstock 5 thereon and getting moved in and out with a servomotor 6 in a Z-axis direction along the turning axis of the work spindle 10, an X-axis table 4 moved in a reciprocating manner with a servomotor 19 in an X-axis direction that intersects with the Z-axis direction at right angles, a sliding base 1 and tool rests 23 installed on the X-axis table 4 in opposition to the headstock 10, various X-axis cutting tools 24 mounted on the tool rest 23, a slide block 16 fastened to sliding base 1, a slider 18 having a Y-axis cutting tool 20 moved in a reciprocating manner over the slide block 16 in a Y-axis direction that intersects with the Y-axis direction at right angles, and driving means forcing the slider 18 to move in and out in a synchronized relation with a turning of the work spindle 10.

With the NC processor constructed as stated just earlier, the Y-axis cutting tool 20 is used directly upon the work 9A to machine sequentially it into a desired contour, as the slider 18 is moved in and out in the Y-axis direction in synchronized relation with the turning of the work spindle 10 in compliance with a preselected profile expected to generate sequentially on the work set up on the jig block 17. Moreover, the slider 18 is driven to move in and out with a linear motor, which is composed of magnetic windings and field magnets allowed to move relatively to the magnetic windings, either of the magnetic windings and the field magnets being installed in the slider 18 and the other in the slide block 16.

In the prior NC processor, the cutting tool to turn the workpiece is usually made of a diamond of single crystal, a tool nose radius R of which is ground below a specific tolerance.

With the prior NC processor to finish the work of transparent resin for optical purposes, nevertheless, any machine marks or traces caused by cutting tool remains on the processed surface of the work even after the completion of the cutting operation, thereby resulting in taking away commercial value from the products. To deal with this issue as stated earlier, the products have to be post-treated of attempting to grind the machined surface of the work to produce a high-quality surface finish on the workpiece.

In the conventional processors of the sort stated earlier, accordingly, the workpiece commonly is first machined to generate a desired profile or contour thereon and then subject to the surface finishing process to remove any scratches and machine marks from the machined surface of the workpiece. Generally, the profile generating process and the surface finishing process are performed, using respective special-purpose machines. This is because two categories of first process for generating any desired contour on the work and the second process or honing process for removing any roughness from the machined surface of the workpiece are distinct in processing technique from one another and therefore can not be realized by only a single processor. Thus, the workpiece has to be removed from the profile generating machine after the completion of the profile generating process and then set on the surface finisher. Handling the workpiece between the distinct processors has caused decreasing the available percentage of the finished product.

Moreover, the workpiece cut into any desired contour has to be reset on another processor. To do this, the workpiece is needed to go through some troublesome process of attempting to get the centre of the workpiece to align accurately with the turning axis of the processor. This reset of the workpiece to the processor would result in raising the percent defective of the products. That is to say, it is almost impossible to align the contour on the workpiece throughout both the preceding process for generating any desired contour on the workpiece and succeeding process to produce the high-quality surface finish. To cope with this, the second process of honing operation is needed to remove a relatively much amount of substance, including a margin of error that would occur due to the reset of the workpiece, from machined surface of the workpiece. This means it would take plenty of time to finish a workpiece while there would be inevitable some discrepancy between the preselected contour and the finished one. This discrepancy could cause any inferior products that are out of conformity to the original design specifications, reducing the available percentage of the finished products.

SUMMARY OF THE INVENTION

The present invention, therefore, has as its primary object to solve the major problems as described just above and more particular to provide a numerical control (NC) processor with an onboard grinding unit, in which a workpiece of synthetic resin and so on is cut accurately in an aspheric contour with a high-speed, high-accelerated Y-axis cutting tool mounted on a slider that is small in inertia force sufficiently to ensure high-speed reciprocating motion, and at once subjected to precise honing operation intact without removed from a chuck in conformity to a desired contour for removing machine marks from a machined surface of the workpiece to finish the workpiece within close size limits whereby both the cutting and honing operations can be performed with just a single processor.

The present invention is concerned with an NC processor with onboard grinding unit; comprising a work spindle supported for rotation on a headstock, chucking means installed on the work spindle to hold a workpiece therein, a Z-axis table having mounted thereon with the headstock and allowed to move in a Z-axis direction lying along an axial direction of the work spindle, an X-axis table allowed to move in an X-axis direction perpendicular to the Z-axis direction, a sliding base fastened to the X-axis table, a slider allowed to move back and forth over the sliding base in a Y-axis direction perpendicular to the X-axis direction, a Y-axis cutting tool installed on the slider to cut the workpiece, a grinding unit installed on the X-axis table in close proximity to the sliding base, and a controller to regulate all the work spindle, the X-axis table and the slider; wherein the controller regulates reciprocating movements of the slider, X-axis table and the Z-axis table in synchronized relation with the rotation of the work spindle so as to first cut the workpiece with the Y-axis cutting tool into a preselected contour, and then finish a work surface of the workpiece with the grinding unit in conformity with a programmed contour while the workpiece remains held in the chucking means even after preceding cutting operation.

In an aspect of the present invention, there is provided an NC processor with onboard grinding unit in which the slider is allowed to move back and forth over the slide block lying on the sliding base in a Y-axis direction perpendicular to the X-axis direction.

In another aspect of the present invention, an NC processor with onboard grinding unit is provided in which the slide block is made thereon with a guide rail extending in the Y-axis direction, on which the slider lies in a way moving back and forth by virtue of electromagnetic force of a linear motor along the guide rail in the Y-axis direction with high speed and high acceleration and the linear motor is composed of magnetic windings and field magnets, either of the magnetic windings and the field magnets being installed in the slide block and the other in the slider.

In another aspect of the present invention, an NC processor with onboard grinding unit is provided in which the controller regulates a cutting operation depending on programming consisting of a revolution of the work spindle along with data indicating locations of a tool tip of the Y-axis cutting tool in the Y-axis direction.

In a further another aspect of the present invention, there is provided an NC processor with onboard grinding unit in which the controller lets the Y-axis cutting tool turn the workpiece in the somewhat rough contour with grinding allowance, and then causes the grinding unit rather than the Y-axis cutting tool to remove the grinding allowance from the work surface of the workpiece in conformity with the programmed contour.

In another aspect of the present invention, an NC processor with onboard grinding unit is provided in which the grinding unit is comprised of a buffing base fastened to the X-axis table, a nozzle mounted on the buffing base to apply an aqueous or oily cutting fluid to the work being processed, a motor mounted on a support that is secured on the buffing base, a tool spindle connected drivingly to the motor through a reduction gear, and a buffing material mounted on the tool spindle to grind the workpiece.

In a further another aspect of the present invention, there is provided an NC processor with onboard grinding unit in which mist of the cutting fluid is ejected from the nozzle against the work surface of the workpiece while being ground into a desired contour.

In another aspect of the present invention, an NC processor with onboard grinding unit is provided in which the workpiece is a lens blank, which adheres to a lens fixture grasped with the chucking means.

In another aspect of the present invention, an NC processor with onboard grinding unit is provided in which an X-axis cutting tool held on a cutting tool rest mounted on the X-axis table first rough cuts the workpiece in a contour approximate to the desired contour, which is in turn finished with the Y-axis cutting tool to produce a high-quality surface finish.

With the NC processor with onboard grinding unit constructed as stated earlier, the slider is allowed to follow well the desired reciprocating motions with high speed and high acceleration, compared with the prior NC processor in which the motor's rpm to drive a ball screw is controlled by position feedback of data representing locations monitored with an encoder, so that the high rpm of the work spindle makes it possible to turn the workpiece with high speed and high acceleration. According to the present invention, moreover, the workpiece after having been cut in a preselected contour is subject to the grinding operation at once while remaining held in the chucking means intact. This makes sure of cutting the running hours needed for grinding operation.

Although the NC processor of the present invention will work with either of a linear motor and a servomotor to get the slider moving in and out, the linear motor is preferable to move the slider with high speed and high acceleration. Selection of the linear motor rather than the servomotor is because that the reciprocating slider itself can be made very small in weight so that an inertia force in the slider is curbed largely to the extent allowing the slider to follow well the high rpm the work spindle. Thus, the slider can be driven with good response to the high speed and high acceleration, thereby making sure of cutting accurately the workpiece with a very short time.

With the NC processor with onboard grinding unit constructed as stated earlier, the workpiece of, for example synthetic resin is first turned accurately in a preselected profile like asymmetrically centered, aspheric contour with a high-speed, high-accelerated Y-axis cutting tool within a very short time, and at once subjected to precise honing operation intact without removed from the chucking means, thereby to remove machine marks left by the Y-axis cutting tool on a machined surface of the workpiece to finish the workpiece within close size limits.

According to the NC processor with onboard grinding unit of the present invention, the workpiece grasped in the chucking means is first machined with the Y-axis cutting tool, and then the workpiece only machined while remaining held in the chucking means intact is ground to the final form with the grinding unit installed on the same sliding base as the Y-axis cutting tool. Thus, the workpiece can be processed accurately at both the cutting and grinding operations within a very short working time. Since there is no possible damage to the workpiece that might occur when the workpiece is reset in the chucking means from the cutting operation to the grinding operation, any unforeseen accident may be prevented in advance and therefore capital investment will be cut down.

In the NC processor in which the slider is constituted with a linear motor, the slider itself can weigh less, thus reducing in inertia force. The slider is improved in following and response abilities conformable to the high rpm of the work spindle. Thus, the slider can be driven to get the Y-axis cutting tool shaping the workpiece with the high speed and high acceleration, thereby making sure of cutting accurately the workpiece with a very short time.

DETAILED DESCRIPTION OF THE PREFERRED EMBODIMENTS

Figure 1:
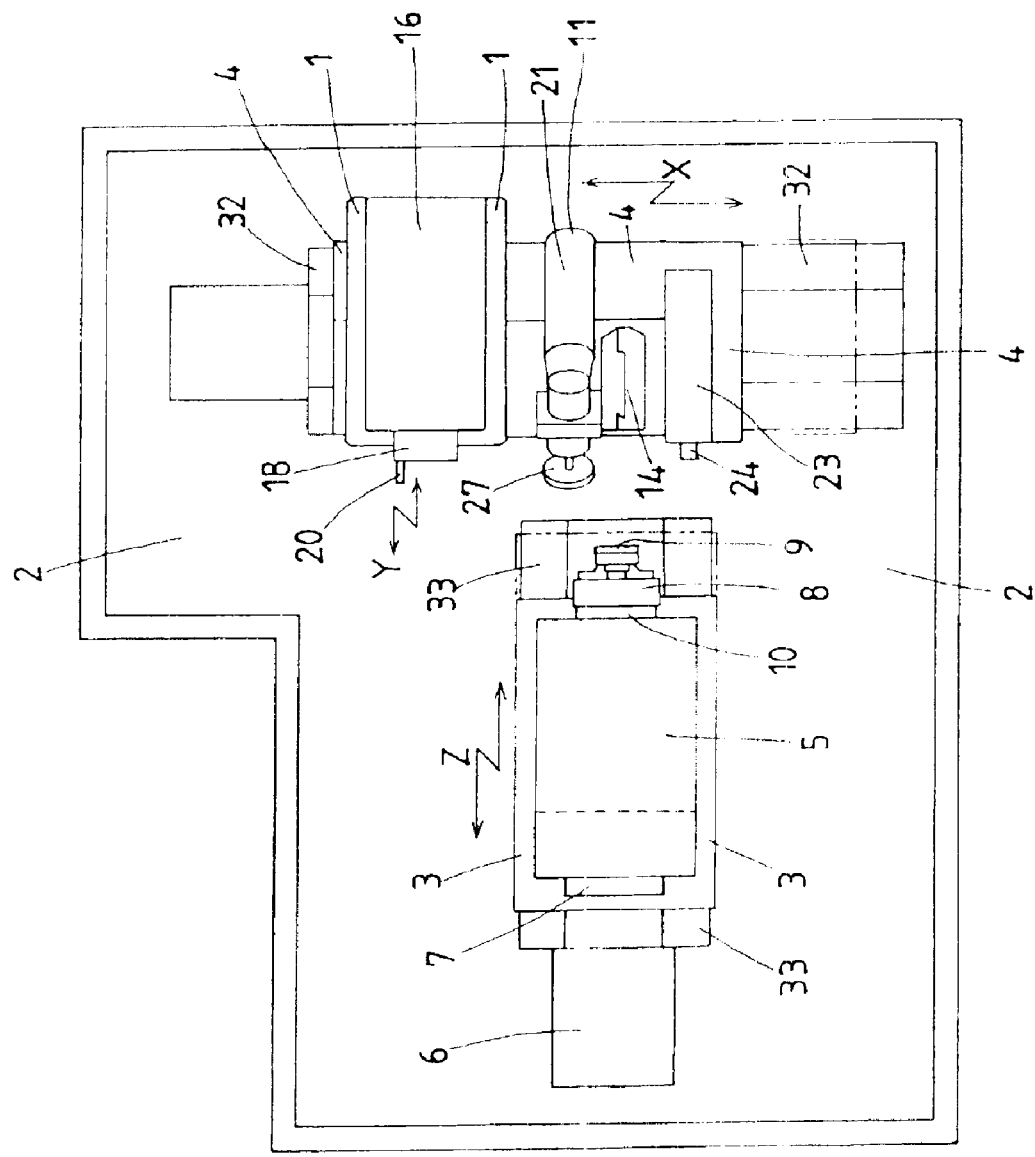
FIG. 1 is a schematic top plan view explaining an NC processor with an onboard grinding unit in accordance with the present invention.
Figure 2:
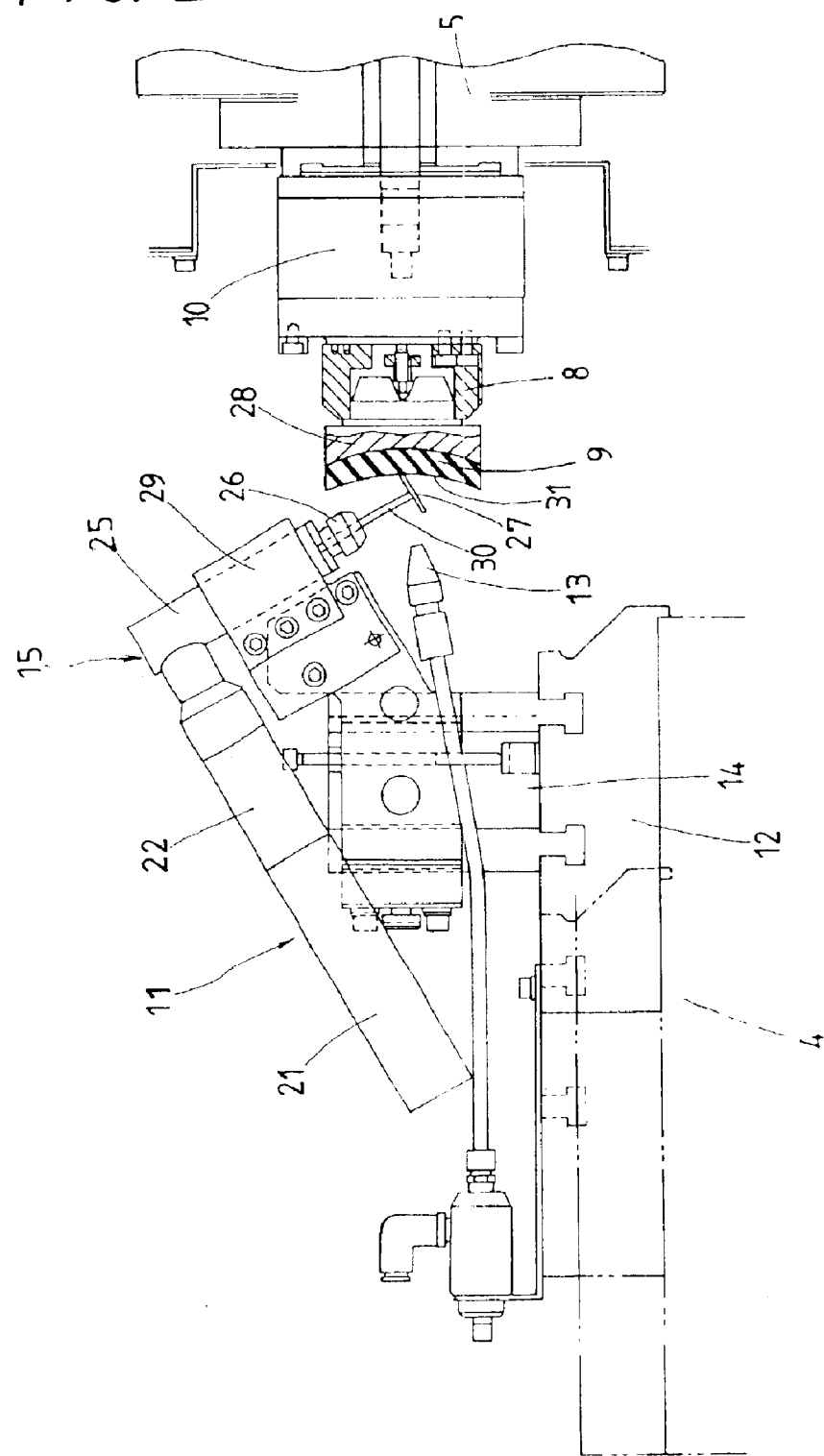
FIG. 2 is a fragmentary front elevation, partly in section, of the grinding unit installed in the NC processor of FIG. 1.
Figure 3:
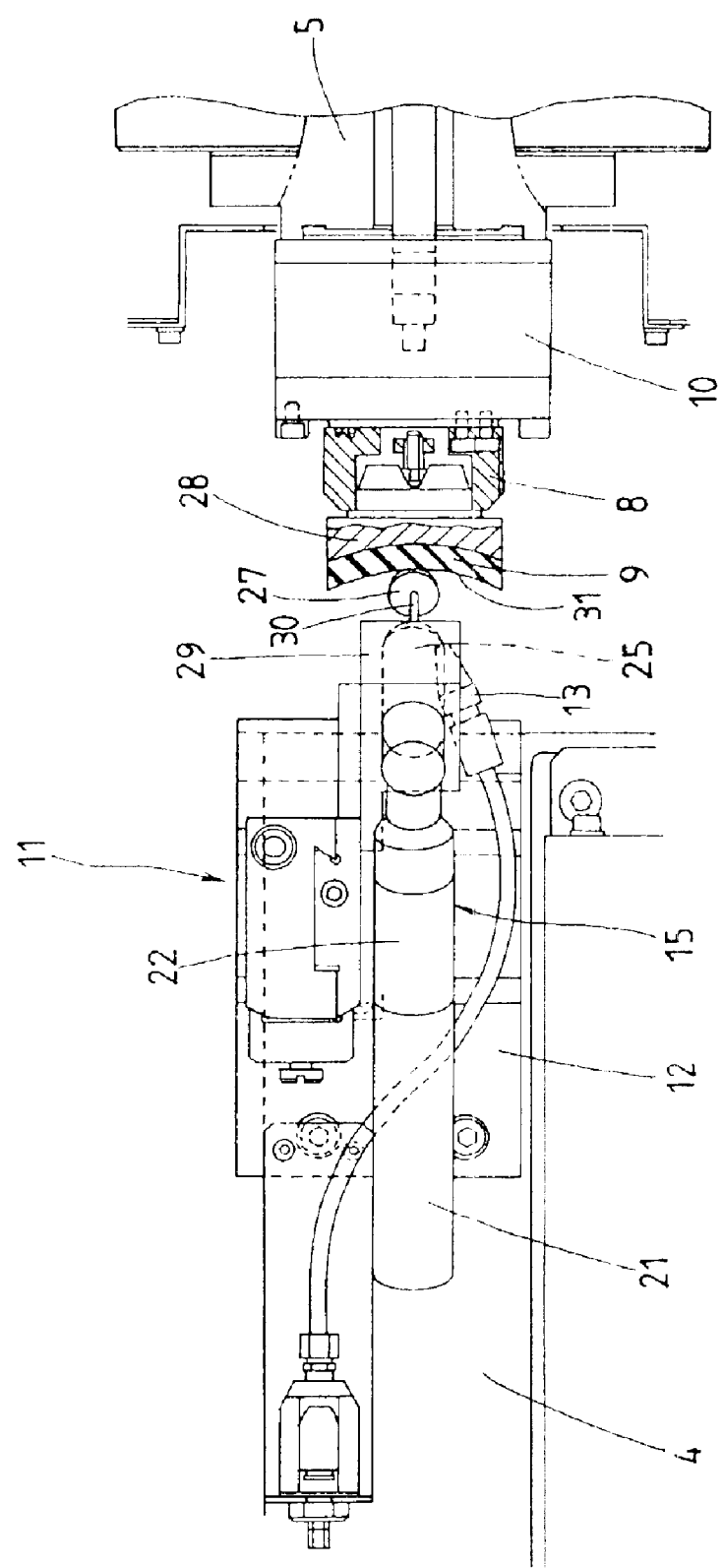
FIG. 3 is a fragmentary plan view, partly in section, of the grinding unit of FIG. 2.
Figure 4:
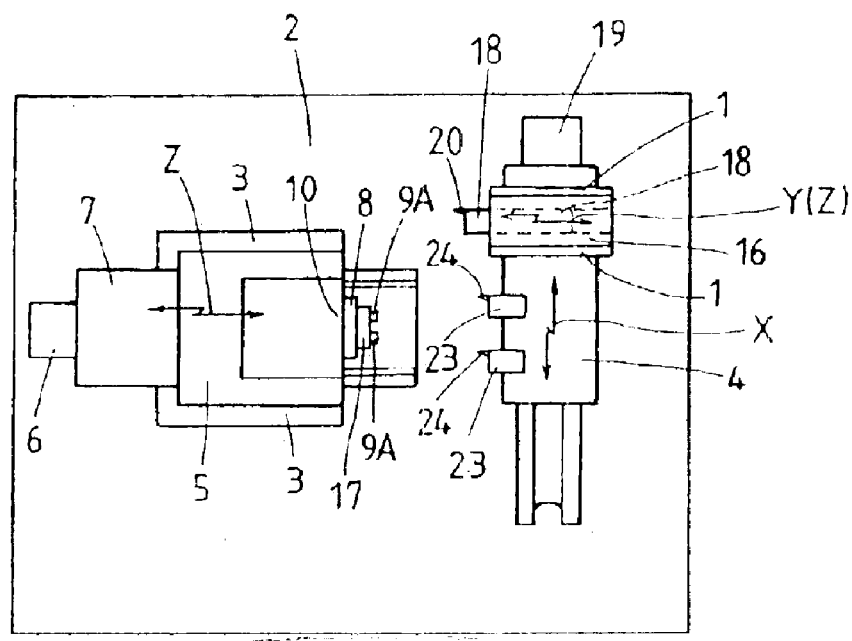
FIG. 4 is a top plan view illustrating a prior NC processor to machine a plurality of works at the same time.

A preferred embodiment of an NC processor with an onboard grinding unit according to the present invention will be explained hereinafter in detail with reference to the accompanying drawings. Compared with the prior NC processor shown in FIG. 4, a work spindle, a Z-axis table movable in a Z-axis direction and an X-axis table allowed to move along an X-axis direction are the same as previously described. To that extent, these components have been given the same reference characters, so that the previous description will be applicable.

The NC processor with onboard grinding unit according to the present invention has, for example a Z-axis table 3 allowed to move in a Z-axis direction extending lengthwise of a work spindle 10 over a Z-axis guide way 33 mounted on a machine bed 2, and an X-axis table 4 movable along an X-axis direction perpendicular to the Z-axis direction over an X-axis guide way 32 installed on the machine bed 2. A headstock 5 rests on the Z-axis table 3, which is driven with a servomotor 6 installed on the Z-axis guide way 33 on the machine bed 2, moving back and forth in the Z-axis direction. The headstock 5 is mounted on the Z-axis table 3 that is allowed to travel in the Z-axis direction lying lengthwise of the work spindle 10. The headstock 5 has incorporated with a spindle motor 7 to turn the work spindle 10, on an extremity of which is provided chucking means where the work 9 is held to get turned while on a rotation of the work spindle 10.

Moreover, the X-axis table 4 is disposed on an X-axis guide way 32 on the machine bed 2 in opposition to the workpiece 9 clamped in the chucking means 8 of the work spindle 10 in such that the X-axis table 4 is allowed to move in the X-axis direction perpendicular to the Z-axis direction along which the Z-axis table 3 will move linearly. The X-axis table 4 has mounted thereon with a sliding base 1, a grinding unit 11 near the sliding base 1, and a cutting tool rest 23 installed near to the grinding unit 11 and provided thereon with a variety of X-axis tools 24.

On the sliding base 1, there is fastened the slide block 16 that is composed of, for example a pair of slide block members having lengthwise recesses, one to each member. The slide block 16 is built on the sliding base 1, for example in such a construction that the slide block members, although not shown, are arranged with their lengthwise recesses facing each other and also any one of the block members is caused to bear against a step on the sliding base 1 while the block members are fastened using a widthwise spacer block on the sliding base 1, with their confronting surfaces being brought into abutment against one another.

The NC processor of the present invention features that the workpiece 9 is first turned with a Y-axis cutting tool 20 into a desired contour as the work spindle 10 rotates on its axis, and then honed or lapped with the grinding unit 11. It is to be noted that the wording "honing or lapping operation with the grinding unit 11" discussed herein rules out any turning or cutting operation to change substantially the contour or profile machined on the workpiece 9. The NC processor of the present invention has the work spindle 10 installed for rotation in the headstock 5 arranged on the machine bed 2, the workpiece 9 held in the chucking means 8 on the work spindle 10, the Z-axis table 3 having mounted thereon with the headstock 5 and able to move in the Z-axis direction extending along the turning axis of the work spindle 10, the X-axis table 4 allowed to move in the X-axis direction perpendicular to the Z-axis direction, the sliding base 1 fastened to the X-axis table 4 in opposite relation to the work spindle 10, a slider 18 allowed to move in and out along a Y-axis direction perpendicular to the X-axis direction, or the same direction as the Z-axis direction, over the slide block 16 supported on the sliding base 1, the Y-axis cutting tool 20 mounted on the slider 18 to cut the workpiece 9, the grinding unit 11 mounted on the X-axis table 4 in close relation to the sliding base 1 in a way opposing the work spindle 10, and a controller, not shown, to activate all the Z-axis table 3, X-axis table 4 and the slider 18 in synchronized relation with the turning of the work spindle 10.

The controller regulates a reciprocating motion of the slider 18 in synchronized relation with the turning of the work spindle 10 to turn or cut the workpiece 9 with the Y-axis tool 20 into a preselected desired contour. Then, the workpiece 9 can experience the lapping or honing operation in a situation stayed held in the chucking means 8 without removed from the chucking means 8 preparatory to the succeeding grinding operation. There the controller regulates the grinding unit 11 to grind a chipped work surface 31 in conformity with a programmed contour.

More particular, the controller is designed to regulate the turning operation depending on programming consisting of a revolution of the work spindle 10 along with data indicating locations of a tool tip of the Y-axis cutting tool 20 in the Y-axis direction. Moreover, the controller is programmed to first move the slider 18 with onboard Y-axis cutting tool 20 in a sliding manner over the sliding base 1 to a location where the Y-axis cutting tool 20 is applied directly on the workpiece 9 held in the chucking means 8, then machining the workpiece 9 with the Y-axis cutting tool 20 into the preselected contour, thereafter bring the grinding unit 11 on the X-axis table 4 to the workpiece 9 that has been cut just once while remaining held in the chucking means 8, then honing or lapping the machined work surface 31 of the workpiece 9 to produce a high-quality surface finish.

With the NC processor of the present invention, in particular, the controller lets the Y-axis cutting tool 20 turn the workpiece 9 in the somewhat rough contour with grinding allowance of, for example from mere tenths of a few $\mu$m to a few $\mu$m. Then, the controller causes the grinding unit 11 rather than the Y-axis cutting tool 20 to grind the work surface 31 of the workpiece 9 in conformity with the programmed contour, thereby improving the surface roughness of the work surface 31 of the workpiece 9 turned previously in the preceding process with the Y-axis cutting tool 20. For controlling the process to grind the work surface 31 of the workpiece 9, some parameters including selection of buffing material 27 in conformity with synthetic resin of the workpiece 9, and turning velocity of the work spindle 10 to rotate the buffing material 27, are set adequately. With the grinding operation of the work surface 31 of the workpiece 9 with the grinding unit 11 in the NC processor of the present invention, moreover, the controller makes use of the learning function and DNC operation to finish the work surface 31 with fidelity. Besides, when the finished surface of the workpiece 9 like lens has need of, for example any coating after the completion of the honing operation of the work surface 31, the surface roughness of the work surface 31 may be regulated to make the coating on the honed surface easier.

The grinding unit 11 is comprised of a buffing base 12, a nozzle 13 mounted on the buffing base 12 to apply aqueous coolants or oily cutting fluids to the workpiece 9 being processed, a motor 21 mounted on a support 14 that is secured on the buffing base 12, a tool spindle 30 connected drivingly to the motor 21 through a reduction gear, and the buffing material 27 mounted on the tool spindle 30 to grind the work surface 31 of the workpiece 9.

With the grinding unit 11 constructed as stated earlier, the cutting fluids of, for example either mist cooling or conventional fluid cooling selected depending on materials of the workpiece 9 are ejected from the nozzle 13 against the work surface 31 of the workpiece 9 being ground and to the grinding tool in order to keep both the workpiece 9 and the grinding tool cool. Of course, the cutting fluids of aqueous solutions may contain some abrasives, depending on the type of product and the operation.

Infeed mode to feed the buffing material 27 into the work surface 31 of the workpiece 9 being cut into the desired contour can be selected properly from among a fixed feed rate mode, a random feed rate mode and an oscillating feed mode, depending on the desired profile on the work surface 31. Pressure to force the buffing material 27 against the work surface 31 of the workpiece 9 being cut into the desired contour can be chosen adequately from among a constantly controlled pressure and a randomly variable pressure.

On the support 14, there is mounted an overhang 29 in which an L-shaped head 15 is held. The L-shaped head 15 includes the motor 21, the reduction gear 22 to get the rpm of the motor 21 reducing, a spindle holder 25 bearing therein for rotation the tool spindle 30 that is turned with the output from the reduction gear 22, a collet chuck 26 to grasp the tool spindle 30, and the buffing material 27 secured to the free end of the tool spindle 30.

The workpiece 9 is a lens blank of synthetic resin and so on, which adheres to a lens fixture 28 grasped with the chucking means 8. The X-axis cutting tool 24 held on the cutting tool rest 23 mounted on the X-axis table 4 first rough cut the workpiece 9 into a contour approximate to the desired profile, which is in turn finished with the Y-axis cutting tool 20 to produce a high-quality surface finish.

The slide block 16 is made thereon with guide rails, not shown, extending in the Y-axis direction, on which the slider 18 lies in a way moving back and forth with the electromagnetic driving power of a linear motor along the guide rail in the Y-axis direction with high speed and high acceleration. The driving means to move in and out the slider 18 in the Y-axis direction can be constituted with, for example, a linear motor of the sort, not shown, which is disclosed in, for example Japanese Patent Laid-Open No. 2002-126907 filed earlier by the present applicant. With the embodiment discussed here, the linear motor is composed of magnetic windings and field magnets allowed to move relatively to the magnetic windings, either of the magnetic windings and the field magnets being installed in the slider 18 and the other in the slide block 16. Fastened on the slide block 16 are the guide rails at several locations to provide linear guide ways extending in the Y-axis direction, which is the same direction as the Z-axis direction, perpendicular to the X-axis direction on the sliding base 1. The slider 18 has sliding elements, by virtue of which the slider 18 is allowed to move in and out in the Y-axis direction with high speed and high acceleration.

There is provided a linear scale extending over a span where the slider 18 is allowed to move in and out, and a sensor responsive to the linear scale. The sensor quickly determines an amount of movement of the slider 18 relative to the slide block 16 to provide an input to the controller. It then adjusts the subsequent movement of the slider 18 on feedback from the sensor. The controller equipped in the NC processor of the present invention has a learning function compensating for deviation of a preselected cutting instruction from current cutting information based on feedback of an actual cutting information resulting from current cutting operation where the Y-axis cutting tool 20 on the slider 18 cuts the workpiece 9 depending on a value representing the preselected cutting instruction, and then getting the compensated mode reflecting in next cutting operation. The controller, moreover, has a predicted function getting the Y-axis cutting tool 20 on the slider 18 cutting the workpiece 9 with any previously stored cutting capabilities in mind.

Although the NC processor with onboard grinding unit of the present invention has been described in the embodiment in which the Z-axis table 3 has mounted thereon with the headstock 5 while the X-axis table 4 has mounted with the grinding unit 11, the Y-axis cutting tool 20 and the cutting tool rest 23, it will be understood that the same is said for the construction in which the X-axis table 4, conversely, has mounted thereon with the headstock while the Z-axis table 3 has mounted with the grinding unit, the Y-axis cutting tool and the cutting tool rest. Having described the present invention as related to just one tool rest 23 on the X-axis table 4, it will be appreciated that any number of the tool rests may be used and also any number of cutting tools can be equipped on the tool rests.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A numerical control (NC) processor with onboard grinding unit; comprising a work spindle supported for rotation on a headstock, chucking means installed on the work spindle to hold a workpiece therein, a Z-axis table having the headstock mounted thereon and allowed to move in a Z-axis direction lying along an axial direction of the work spindle, an X-axis table allowed to move in an X-axis direction perpendicular to the Z-axis direction, a sliding base fastened to the X-axis table, a slider allowed to move back and forth over the sliding base in a Y-axis direction perpendicular to the X-axis direction, a Y-axis cutting tool installed on the slider to cut the workpiece, a grinding unit installed on the X-axis table in close proximity to the sliding base, and a controller to regulate all the work spindle, the X-axis table and the slider;

wherein the controller regulates reciprocating movements of the slider, X-axis table and the Z-axis table in synchronized relation with the rotation of the work spindle so as to first cut the workpiece with the Y-axis cutting tool into a preselected contour, and then finish a work surface of the workpiece with the grinding unit in conformity with a programmed contour while the workpiece remains held in the chucking means even after a preceding cutting operation.

2. A numerical control (NC) processor with onboard grinding unit constructed as defined in claim 1, wherein the slider is allowed to move back and forth over a slide block lying on the sliding base in the Y-axis direction perpendicular to the X-axis direction.

3. A numerical control (NC) processor with onboard grinding unit constructed as defined in claim 2, wherein the slide block is made thereon with a guide rail extending in the Y-axis direction, on which the slider lies in a way moving back and forth by virtue of electromagnetic force of a linear motor along the guide rail in the Y-axis direction with high speed and high acceleration and wherein the linear motor is composed of magnetic windings and field magnets, either of the magnetic windings and the field magnets being installed in the slide block and the other in the slider.

4. A numerical control (NC) processor with onboard grinding unit constructed as defined in claim 1, wherein the controller regulates a cutting operation depending on programming consisting of a revolution of the work spindle along with data indicating locations of a tool tip of the Y-axis cutting tool in the Y-axis direction.

5. A numerical control (NC) processor with onboard grinding unit constructed as defined in claim 1, wherein the controller lets the Y-axis cutting tool turn the workpiece in the somewhat rough contour with grinding allowance, and then causes the grinding unit rather than the Y-axis cutting tool to remove the grinding allowance from the work surface of the workpiece in conformity with the programmed contour.

6. A numerical control (NC) processor with onboard grinding unit constructed as defined in claim 1, wherein the grinding unit is comprised of a buffing base fastened to the X-axis table, a nozzle mounted on the buffing base to apply a cutting fluid to the work being processed, a motor mounted on a support that is secured on the buffing base, a tool spindle connected drivingly to the motor through a reduction gear, and a buffing material mounted on the tool spindle to grind the workpiece.

7. A numerical control (NC) processor with onboard grinding unit constructed as defined in claim 6, wherein mist of the cutting fluid is ejected from the nozzle against the work surface of the workpiece while being ground into a desired contour.

8. A numerical control (NC) processor with onboard grinding unit constructed as defined in claim 1, wherein the workpiece is a lens blank, which adheres to a lens fixture grasped with the chucking means.

9. A numerical control (NC) processor with onboard grinding unit constructed as defined in claim 1, wherein an X-axis cutting tool held on the cutting tool rest mounted on the X-axis table first rough cuts the workpiece in a contour approximate to the desired contour, which is in turn finished with the Y-axis cutting tool to produce a high-quality surface finish.

* * * * *